Oct. 28, 1924.　　　　　　　　　1,513,344
H. M. PFLAGER
MOTOR TRUCK
Filed June 17, 1922　　3 Sheets-Sheet 2
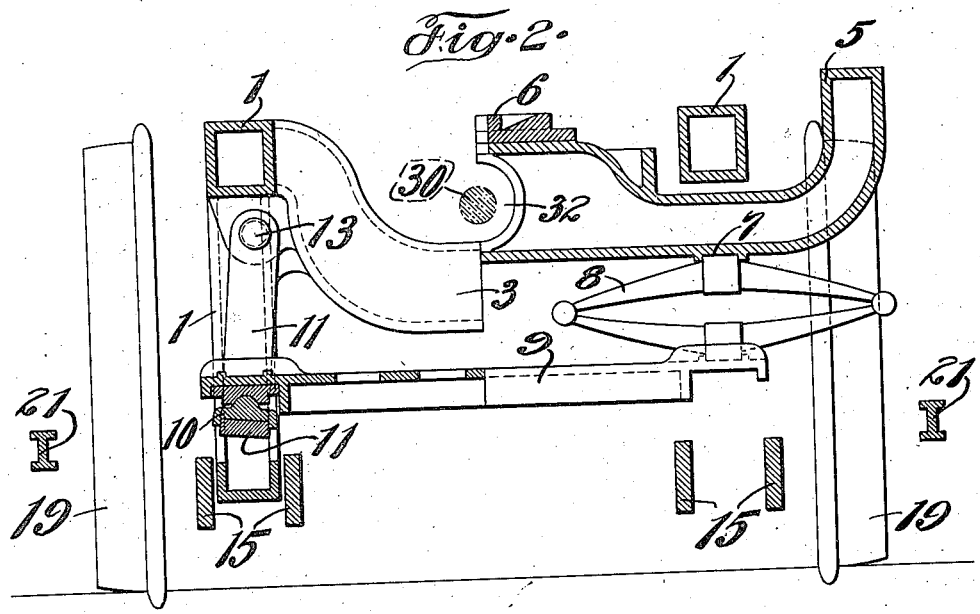
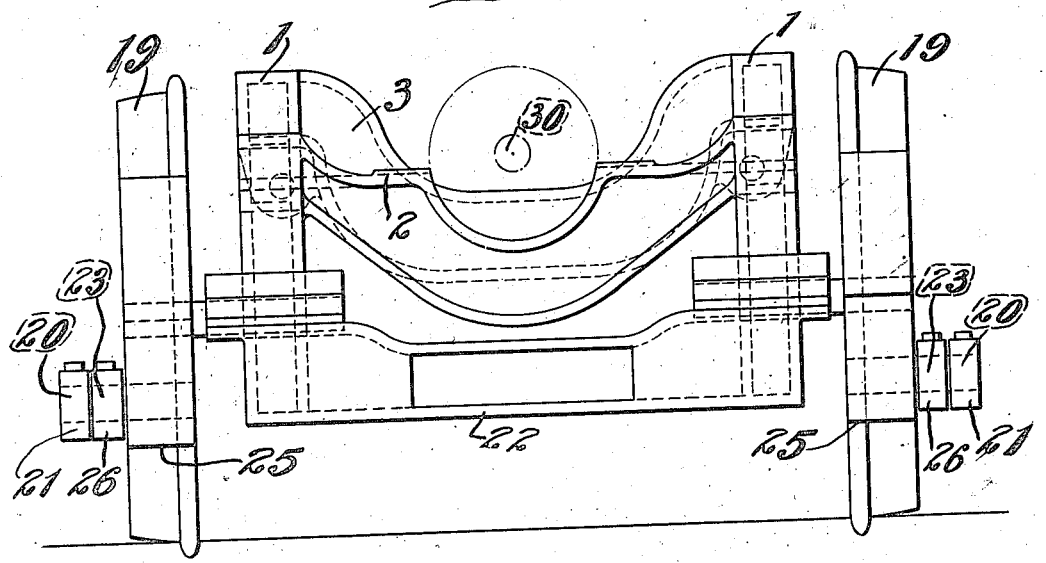
INVENTOR
HARRY M. PFLAGER
ATTORNEY Oct. 28, 1924.
H. M. PFLAGER
1,513,344
MOTOR TRUCK
Filed June 17, 1922   3 Sheets-Sheet 3
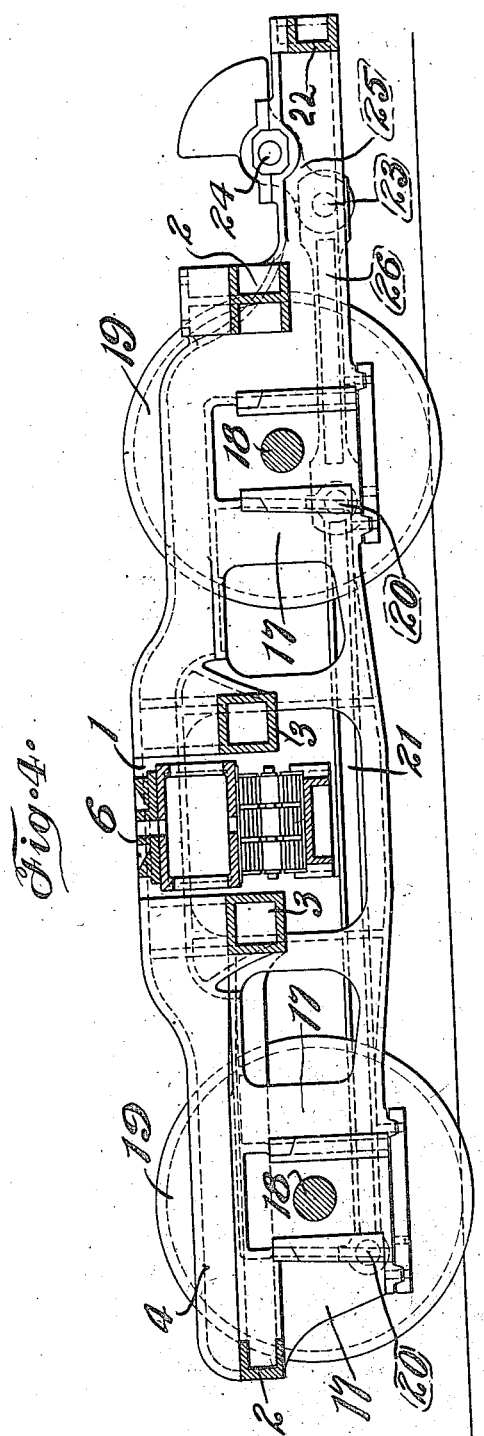
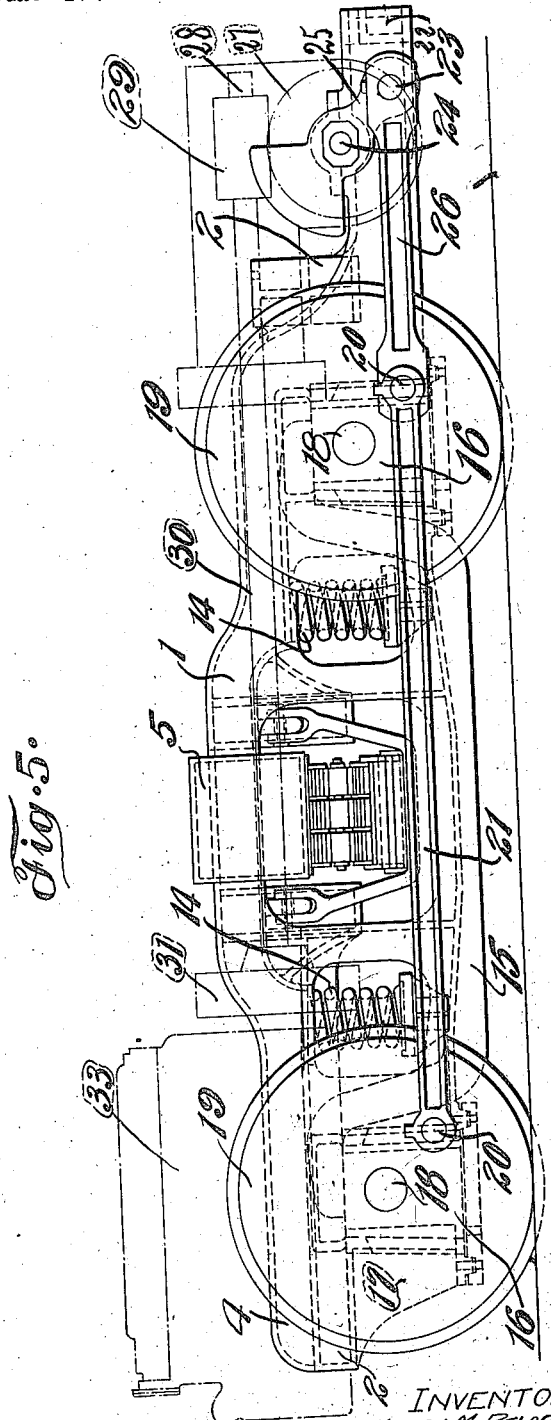
INVENTOR
HARRY M. PFLAGER.
ATTORNEY Patented Oct. 28, 1924.

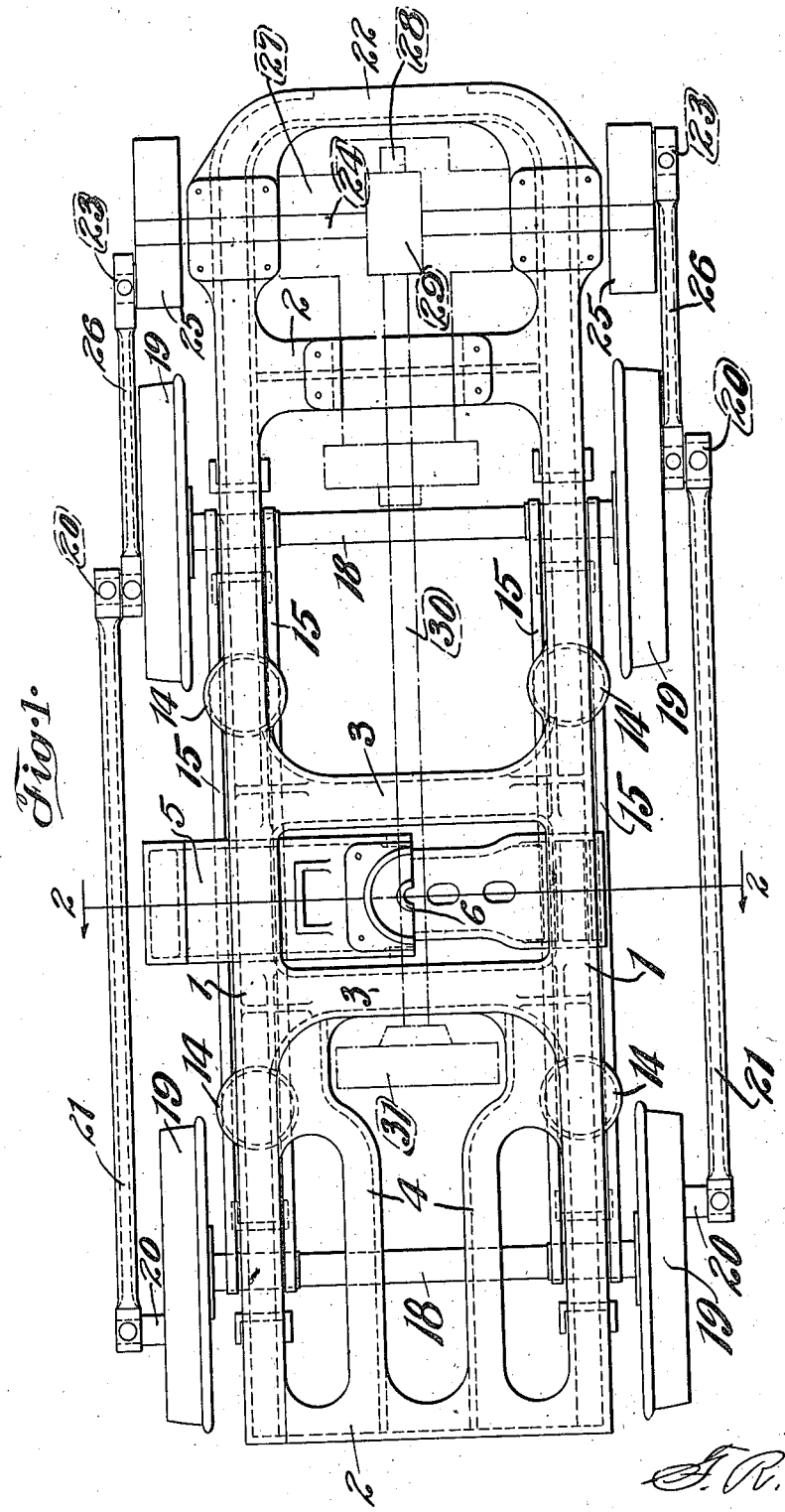

1,513,344

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

MOTOR TRUCK.

Application filed June 17, 1922. Serial No. 569,143.

*To all whom it may concern:*

Be it known that I, HARRY M. PFLAGER, a citizen of the United States, residing at the city of St. Louis, and State of Missouri, have invented a certain new and useful Improvement in Motor Trucks, of which the following is a full, clear, and exact description, such as will enable others skilled in the art to which it appertains to make and use the same, reference being had to the accompanying drawings, forming part of this application, in which,—

Figure 1 is a top plan view of my improved motor truck.

Figure 2 is a sectional view taken on line 2—2 of Figure 1.

Figure 3 is an end elevational view.

Figure 4 is a longitudinal vertical section.

Figure 5 is a side elevation.

This invention relates to a new and useful improvement in motor trucks of the type disclosed in a copending application filed by me of even date herewith.

The object of this invention is to construct a motor truck frame and engine mount of cast steel, gearing the motor shaft to a countershaft mounted on a rigid extension on the underframe, which countershaft operates cranks at each end thereof which are connected by any suitable pitmans to crank pins on the truck wheels, said truck wheels being in turn connected by connecting rods.

The truck is equipped with a conventional type of internal combustion engine with the usual friction clutch and selective driving gear, whereby the countershaft is driven, and by the pitmans and connecting rods the truck wheels are likewise driven. The type of motor employed may be of any commercial type, and preferably is capable of developing from three to six hundred horsepower depending upon the grades encountered and the load to be hauled.

In practice, there is usually a truck under each end of the car, and each of these trucks may be motor-equipped with controlling means therefor extending through the platform of the car and into a vestibule or cab located at the end or ends of the car. Each car thus becomes a self-contained motor driven unit and may be employed on side, branch and tap lines, as they are sometimes called, in hauling or delivering freight to the main lines. Being of standard gauge and having standard equipment, such a motor car can be coupled to a train on the main line for a long haul. The motor car, of course, will take care of the shorter hauls, and by replenishing the liquid fuel, may make hauls of greater or less distance.

I have illustrated an internal combustion engine as a form of motive power used, but it is obvious that other types of motors could be employed. Where the road is electrified, electric motors could be used.

In the drawings, the truck frame is shown as being made of a single casting, preferably steel, in which 1 indicates the side members, 2 the end members and 3 the transom members. The side members and transoms are preferably box-shaped in cross-section (as shown in Figure 2) while the end members, as indicated at the left and right of Figure 4, are substantially channel-shaped and I-shaped respectively. These end transom members may be provided with perforated lugs for the attachment of the brake rigging (not shown).

4 are channel shaped longitudinally disposed members extending from one of the end members 2 to one of the transoms 3, said members 4 diverging slightly, as shown in Figure 1, to provide a space for the flywheel of the engine which is supported by the members 4.

5 indicates the bolster having the usual center bearing 6, said bolster having spring seats 7 near each end resting upon springs 8, shown in this instance as elliptic springs. The ends of the bolster extend under the side members of the truck frame and are bent upwardly and outwardly to provide side bearings for the car body, (see Figure 2).

Springs 8 rest upon spring plank 9 which is in turn supported by the cross-member 10 of supporting links 11. These supporting links are supported in position by means of pins 13 passing through bearings in the ends of transom 3.

14 indicates frame supporting springs resting upon spaced equalizer bars 15, the ends of said bars being goose-neck in shape and supported by the journal boxes 16. These journal boxes are arranged between pedestal jaws 17 extending downwardly from the side frame members 1 and preferably the equalizer bars 15 are arranged on each side of the pedestal jaws, as shown in Figure 1.

18 indicates the wheel axles and 19 the wheels, each wheel being provided with a crank pin 20 on which is mounted the connecting rod 21. 22 indicates the end of an extension of the truck frame, said extension being provided with spaced upwardly facing machine finished surfaces to which may be bolted bearing caps as indicated.

24 is a countershaft mounted in the bearings provided by the truck extension, such countershaft having counterbalanced crank arms 25 on each end connected by means of pins 23 and pitmans 26 to the crank pin of the adjacent truck wheel. 28 indicates a gear casing for housing in a worm gear 27, with which worm gear meshes a worm 29 on a shaft 30 extending lengthwise of the truck and being provided with a balance or flywheel 31 on its other end and beyond the bolster. The bolster is provided with openings 32 through which the engine driven shaft 30 passes. The transoms 3 are depressed at their centers so that this engine driven shaft 30 is free to rotate thereabove (see Figure 2).

33 indicates the engine casing mounted upon the supporting members 4, said engine casing being provided with the usual complement of cylinders and being connected to drive the shaft 30. The gear casing 27 may house the transmission gear.

I have not shown any of the controlled parts for my improved motor truck, but it is obvious that these may be provided to be operated from a cabin or vestibule in the end of the car under which the truck is arranged.

It will be observed that the engine and the counter-shaft which it drives are mounted on the same rigid frame and hence are not liable to get out of alinement due to any change in the ultimately driven wheels with respect to the truck frame. The relation between the countershaft and the truck wheels which it drives is such that said wheels are permitted a slight independent vertical movement as well as lateral play without disturbing the pitman and connecting rod connections.

What I claim is:

1. A truck frame consisting of a single steel casting having side, end and transom members, longitudinally disposed motor supporting members between an end and an adjacent transom member, and a countershaft supporting extension arranged at the opposite end of the truck frame.

2. A truck frame having side, end and transom members, pedestal jaws and boxes, axles mounted in said boxes, wheels thereon, motor supporting frame members arranged at one end of said truck frame, and countershaft supporting frame members arranged at the opposite end of said truck frame, a counterbalanced crank shaft thereon and pitman connections between said crank shaft and said wheels.

3. In a truck, a frame including transoms, a bolster, wheels and axles, a motor mounted upon one end of said frame, a counter shaft mounted on the other end of said frame, and a drive shaft connecting said motor and counter shaft and passing through said bolster and over said transoms, and driving connections between said counter shaft and said wheels.

4. A truck having transoms depressed at their centers, a driving shaft extending above the depressed portions of said transoms and throughout a substantial part of the length of the truck, a motor for driving said shaft, said motor being supported by one end of the truck, and a countershaft driven by said motor, said countershaft being mounted in the opposite end of said truck.

5. In a truck, a frame including side pieces and transoms connecting said side pieces and depressed between the same, a motor on one end of said frame, and a drive shaft extending over the depressed portions of said transoms toward the other end of said frame.

6. The combination of a one-piece truck frame designed to support a motor at one end and a countershaft at its opposite end, a motor, a countershaft, driving connections between said motor and countershaft, truck wheels, and driving connections between said countershaft and truck wheels located beyond the sides of the truck frame.

7. The combination of a truck frame, its wheels and axles, a bolster supported in said frame, said bolster being provided with openings or recesses for the passage of a rotating shaft, and transoms on each side of said bolster, said transoms being deflected to permit the passage of said shaft.

8. In a truck, a frame including side pieces and transoms connecting said side pieces and depressed between the same, a bolster having a transverse opening above the top of the depressed portions of said transoms, a motor on one end of said frame, and a drive shaft extending over said transoms and through the opening in said bolster toward the other end of said frame.

9. In a one-piece cast truck frame, side pieces, pedestals, ends, an integral extension on one of said ends in substantial alignment with said sides and pedestals and provided with bearing surfaces for a transverse counter shaft located beyond the end of the frame proper.

10. In a truck, a one-piece cast frame including pedestals and bearings for a transverse counter shaft spaced from said pedestals, said pedestals and bearings being in substantial alignment, a wheeled axle mounted in said pedestals, a counter shaft journal in said bearings, and pitmans between said wheels and the ends of said counter shaft.

In testimony whereof I hereunto affix my signature this 12th day of June, 1922.

H. M. PFLAGER.